United States Patent

Schmidt

Patent Number: 6,079,235
Date of Patent: Jun. 27, 2000

[54] PATTERNED FLOAT PLATED FABRICS AND METHODS FOR MANUFACTURING AFORESAID

[75] Inventor: Walter Richard Schmidt, Krams, Austria

[73] Assignee: Pai Lung Europe Koch & Co. GmbH, Albstadt, Germany

[21] Appl. No.: 09/077,927
[22] PCT Filed: Dec. 6, 1996
[86] PCT No.: PCT/EP96/05476
§ 371 Date: Aug. 28, 1998
§ 102(e) Date: Aug. 28, 1998
[87] PCT Pub. No.: WO97/20977
PCT Pub. Date: Jun. 12, 1997

[30] Foreign Application Priority Data

Dec. 7, 1995 [DE] Germany .......................... 195 45 770

[51] Int. Cl.[7] .................................................. D04B 9/34
[52] U.S. Cl. ............................... 66/136; 66/190; 66/201
[58] Field of Search ........................... 66/180, 136, 137, 66/194, 201, 169 R, 170, 171, 190

[56] References Cited

U.S. PATENT DOCUMENTS 4,034,581  7/1977  Swafford .
5,186,025  2/1993  Neher ........................... 66/9 R

FOREIGN PATENT DOCUMENTS 0 295 703   12/1988   European Pat. Off. .
3135702 A1   3/1983   Germany .
3927815 A1   2/1991   Germany .

Primary Examiner—Danny Worrell
Attorney, Agent, or Firm—Pillsbury Madison & Sutro LLP

[57] ABSTRACT

A patterned float plated fabric composed of courses incorporates at least two plating yarns dominating alternating patterned sections of the fabric with the floats of their float plated portions, such that a ground fabric is composed from sections of plain courses formed complementary from one of the at least two plating yarns and such that sections of plain ground fabric courses are connected together by at least one stitch formed from the yarns forming the ground fabric of the adjacent patterned sections. Additionally, a process for forming the patterned float plated fabric includes holding down the fabric with a lower throat of a sinker; raising portions of needles to a clearing position; feeding first plating yarn to the raised needles; arranging the sinkers such that their lower looping ledge is between the needles, retracting the needles to an lower intermediate position. Thereafter the following succession of steps is repeated at least one: actuating the sinkers to control the loops and floats; raising portions of the needles to a clearing position; feeding a second plating yarn to the raised needles; retracting the needles to an upper intermediate position forming loops and floats; retracting the sinkers to a lower intermediate position; and retracting all needles from the lower intermediate position so as to knit a new float plated course.

10 Claims, 10 Drawing Sheets

Fig.7G
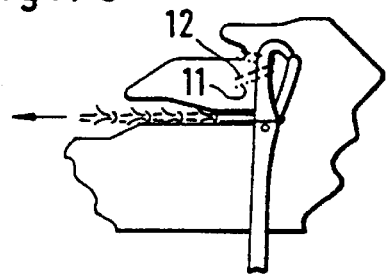
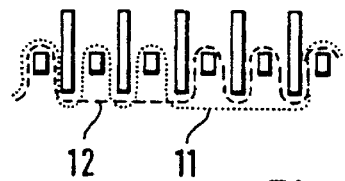
Fig.7N
Fig.7H
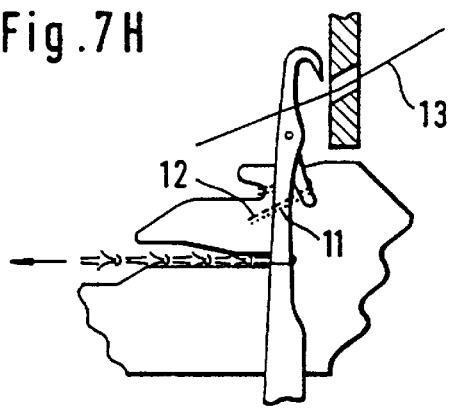
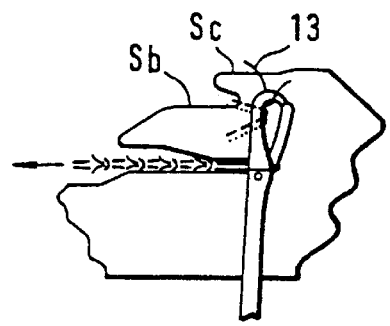
Fig.7J
Fig.7K
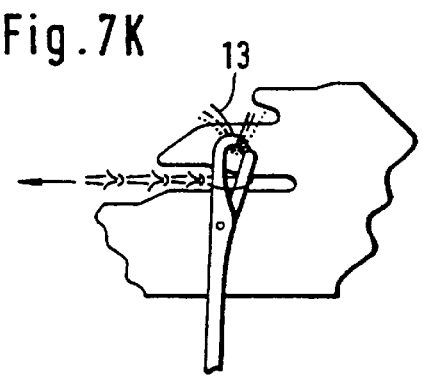
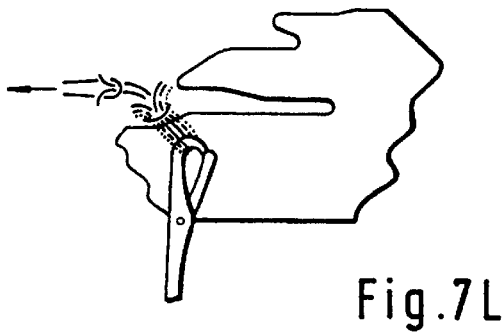
Fig.7L

PATTERNED FLOAT PLATED FABRICS AND METHODS FOR MANUFACTURING AFORESAID

This application is the national phase of international application PCT/EP96/05476 filed Dec. 6, 1996.

BACKGROUND OF THE INVENTION

1. Field of the Invention

Float plated fabrics are patterned in adjoining areas of the fabric alternatively by floats from one of at least two yarns from which the courses are composed.

2. Description of Prior Art

To obtain a circular single jersey fabric with a woven-like appearance it is necessary to arrange yarn floats on the reverse side of the fabric (technical back). Such fabric structures are created widely by knitting lay-in yarns into a plain jersey ground fabric. By an individual arrangement of the tuck stitches of the lay-in yarn the surface of the fabric is structured according to a pattern. Lay-in yarns will restrict the elasticity of the fabric, so that this fabric, as well as woven fabrics, for special applications, in which stretchable fabrics are required (for example highly molded parts in the transportation industry), are of inadequate suitability.

Another disadvantage of lay-in fabrics is, that in case of a stress to the surface of the fabric, especially by abrasion, instead of the lay-in yarn the meshing ground yarn is destroyed, so that the fabric becomes useless. Furthermore under the conditions of lay-in constructions the patterning is widely limited to plain-color structures.

A qualitative improvement is performed by individual controlled float plating. This technique is well known, for example as "mesh", in which a course is composed from a ground yarn knitted in all stitches and a plating yarn knitted in predetermined stitches with floats in between.

With this method fabrics with sufficient flexibility are realized and if the surface is stressed by abrasion at first the floats of the plating yarn are destroyed and then the ground fabric. Comparable to lay-in fabrics the patterning of this fabric is limited by the same restrictions.

To increase the patterning possibilities and the density of the floats it is practiced recently to compose a course from one ground and two plating yarns.

According to a previous proposal, as disclosed in German Patent 664 661, in each feeder, at first, two plating yarns are fed alternately to predetermined needles and subsequently the ground yarn is fed to all needles. The disadvantage of this method is that, notwithstanding an extraordinary exact adjustment of the yarn carriers, a great number of faults occur. The required arrangement of the plating yarns alternatingly in the hooks and behind them on adjacent needles leads to an uncontrollable tensioning of the yarns, especially when the needle selection is continuously changed. For this reason, this proposal, as well as variations based thereon, for example, as disclosed in German Patent 671333, were not realized to a great extent.

According to another proposal described in U.S. Pat. No. 3,406,538 directed to the manufacturing of three thread fleece, the above described disadvantages are avoided by a succeeding feeding and kinking of the yarns one after the other prior to the stitch forming action. This method was also modified for manufacturing of float plated fabric, whereby two float plating yarns are subsequently kinked from alternative needles on the medium ledge of the sinkers, succeeded from kinking a face yarn (ground yarn) by all needles to a complete float plated course by the stitch forming action.

Based on this procedure the method for manufacturing a patterned plush fabric as referred in the proposal DE-A-31 45 307 was developed. It is also noted therein that plated portions are obtained by an advanced retracting of the sinkers (DE-A-31 45 307, column 7, lines 12 to 25; respectively corresponding U.S. Pat. No. 4,612,784 column 5, lines 54 to 66). It becomes apparent that by the advanced retraction of the sinkers the previously kinked yarn loops are not controlled thereafter, so that a deformation or a destroying of the uncontrolled loops will occur.

This will be improved by the proposal referred in the DE-A-39 27 815 in which based on a method according to the previously mentioned DE-A-31 45 307 an additional ground yarn is meshed into the ground fabric in a float plating relationship (illustrated in FIG. 1 to 5) or knitted alternatively one to the other (see column 10, lines 18 to 22 and claim 2). As illustrated and described with reference to FIG. 8 the yarns for the ground fabric are kinked in succeeding sections on the upper ledge of the ground sinker, or both yarns are fed to alternative needles and kinked in the same section according to the embodiment of FIG. 9. When kinking at least a second ground yarn subsequent to the first ground yarn as required for the float plated relationship, also the plush sinkers, controlling the previous loop structure of the first yarn, must be retracted prior to the looping (kinking) of the second ground or plating yarn, so that the control of the loops from the first ground yarn is interrupted and the loop structure can be affected.

Another variation for manufacturing float plated fabrics is produced by a modification of the proposal as described in the EP-A-0,295,703 and referred to in Wirkerei-Strickerei-Technik No. 10/1994 pages 824–830 or Melliand Textilberichte No. 1/1994, pages 34–38. In this process the ground yarn is not kinked prior to the stitch forming action so that the kinking of the plating (pile) yarns over a looping ledge of the sinkers and the control of the loop structure up to the stitch forming action are not affected.

As obvious from the mentioned documents the plating yarns are always kinked alternatively one to the other, so that for the plated structure additional ground yarns, knitting the plain ground fabric courses are required which will increase the material costs and impedes the construction of lightweight fabrics.

SUMMARY OF THE INVENTION

With the foregoing in mind it is an object of this invention to create patterned float plated fabrics and relevant methods for their production on circular knitting machines in which a ground yarn, exclusively knitting a plain course, is avoided and the possibilities for creating new fabrics are increased.

The objects of the invention are realized by knitting a single jersey fabric in which each course is composed from ground fabric portions knitted complementary alternatingly from one of at least two yarns according to a pattern and cooperatively knitting the alternative yarn(s) in float plating relationship to plated stitches in predetermined wales with floats in between. Knitting with three predetermined float forming yarns facilitates the ability to increase the creation of additional colored fabrics.

Additional to the manifold patterning possibilities by saving an exclusive ground yarn, the knitting process is performed faster by a reduced space therefor whereby the production capacity is increased. The special and unlimited possibilities for creating new pattern constructions will rise from the description of the invention.

BRIEF DESCRIPTION OF THE DRAWINGS

The invention shall be explained in more details by the description of basic constructions of patterned float plated fabrics and methods for their manufacturing by means of embodiments therefore, illustrated in the enclosed simplified schematic drawings, wherein:

FIG. 7A to 7L are side views to the stitch forming parts of the needles and sinkers according to the positions in FIG. 7 indicated with A2 to L2.

FIG. 7M and 7N illustrate the disposition of the kinked yarns according to FIG. 7B and 7G, seen from the top.

DETAILED DESCRIPTION OF THE PRESENT INVENTION

Figure 1:
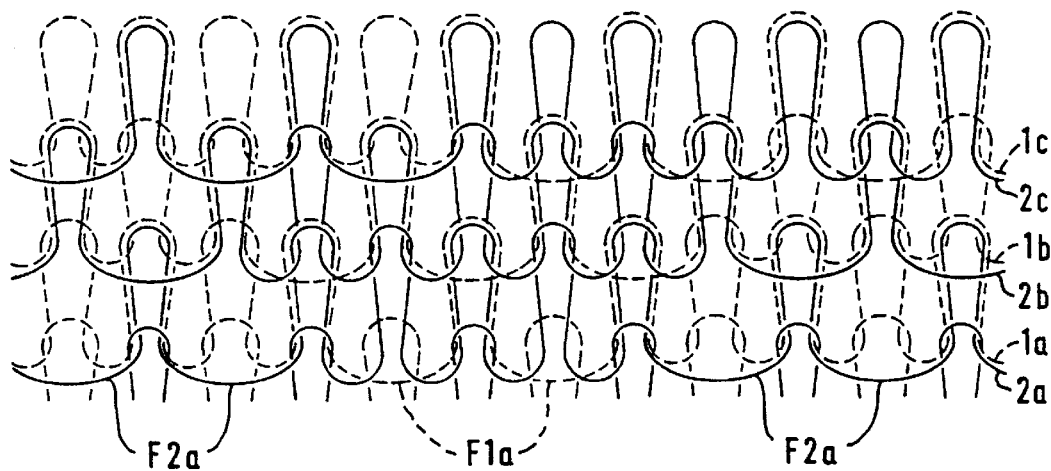
FIG. 1 and FIG. 2 are excerpts of fabric constructions composed from two plating yarns per course.
Figure 2:
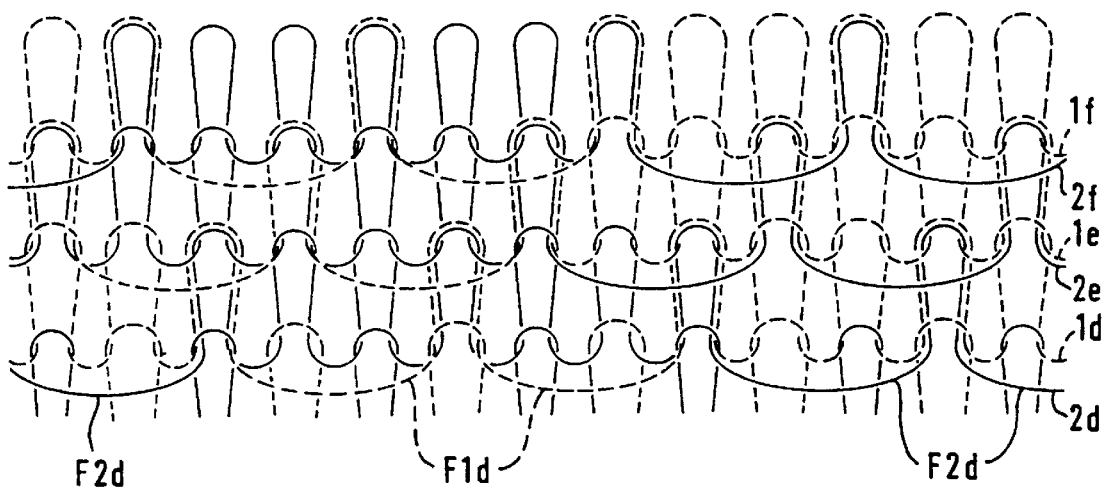

FIG. 1 and FIG. 2 each illustrate part of a patterned float plated fabric in which each course includes two yarns. A first group of yarns 1 (1a, 1b, 1c in FIG. 1, and 1d, 1e, 1f in FIG. 2, respectively) are knit together with a second group of yarns (2a, 2b, 2c in FIG. 1, and 2d, 2e, 2f in FIG. 2, respectively) to plate stitches according to a predetermined pattern. Each second stitch in FIG. 1 and each third stitch in FIG. 2 is knit from both groups of yarns.

Corresponding to these arrangements the first course knit in FIG. 1 from the yarns 1a and 2a includes predetermined yarn floats F1a and F2a from yarns 1a and 2a, respectively. In the same way the second course is composed of the yarns 1b and 2b while the third course is knit using yarns 1c and 2c. According to the provided pattern, floats of both groups of yarns are individually arrangeable, one to the other.

Referring to FIG. 2 in which each third stitch is knit from both groups of yarns in the first course from the yarns 1d and 2d, floats F1d and F2d are arranged to spread over two wales. Corresponding to the first course the second course is knit from the yarns 1e and 2e and the third course is knit from the yarns 1f and 2f.

From both illustrations in FIGS. 1 and 2 and the description, predetermined alternative sections of the fabric result when one of the two yarns is knit to a ground yarn portion to all stitches of the relevant section while the other yarn is knitted alternatingly to float according to a pattern.

When floats of the plating yarn portions are cut, the stitches of the ground fabric portion behind formed behind the other yarn will remain intact, and by forming the floats between plated stitches the adjoining portions of the fabric are not affected therefrom. This essential interlocking can be improved when connecting alternative portions of the fabric by knitting two or more plated stitches, so that a perfect solidity fabric is obtained when the knitting of ground yarns portions is changed from one yarn to the other.

As is evident from the drawings of FIG. 1 and FIG. 2 and the foregoing description each pattern area of a fabric produces an arrangement of plated stitches. Corresponding to this arrangement, the length of the floats from both yarns respectively is disposable according to the requirements of a pattern. The length of the floats are preferably limited to overlaps of three wales. As a variation of FIG. 1 and FIG. 2, two or more plated stitches may be arranged between floats, respectively, and plain plated portions of the fabric can be provided to achieve an additional pattern effect.

Proceeding from this it must be noted that for the creation of patterns for plated fabrics unlimited possibilities are available.

Figure 3:
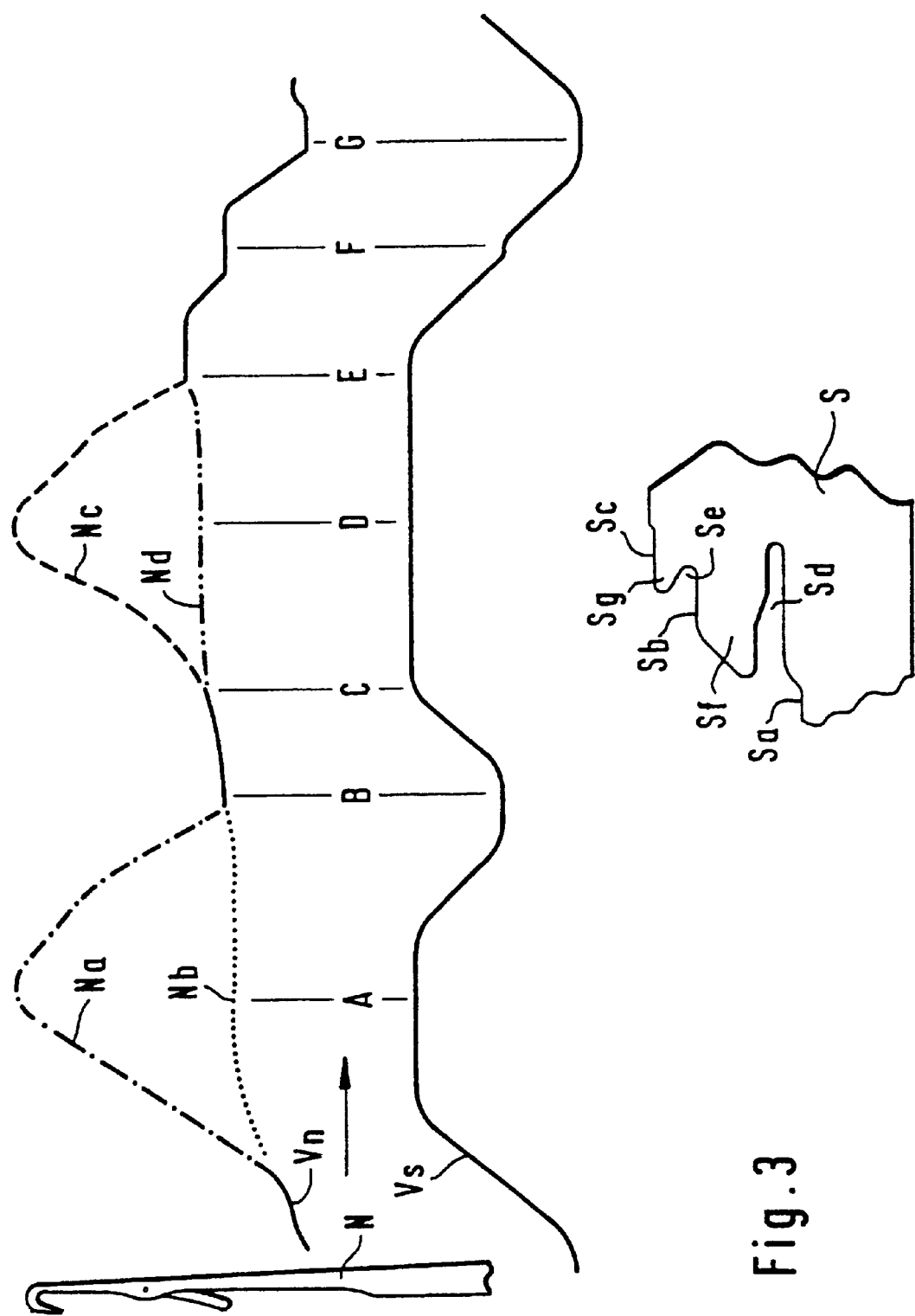
FIG. 3 is a diagram showing the tracks of the needles and sinkers for knitting a float plated course from two yarns.

One of the different possibilities for manufacturing the above described patterned float plated fabric is shown in FIG. 3. The movement of the needles N and sinkers S according to their tracks Vn and Vs, respectively, is performed from the left to the right and after a complete pass a course is knitted.

For knitting a fabric according to the invention a circular knitting machine with an individual needle selection is used. Such machines are well known so that a description of the operation is not necessary.

The process shown in FIG. 3 also requires sinkers which are used for the manufacturing of invisible fleece (three thread fleece). They have looping ledges (Sa, Sb, Sc) in different levels, two throats (Sd, Se) and two a sinker nebs (Sf, Sg).

As well known from the manufacturing of three thread fleece fabrics, as described in U.S. Pat. No. 3,406,538, subsequent to the stitch forming action of a course the sinkers S are actuated inwardly to a position toward the inside of the machine, as in FIG. 3A, so that the previous knitted course is engaged by the lower throat Sd which will prevent the fabric from being raised together with the needles.

For the engagement of a first yarn 1 predetermined needles are raised, according the curve Na, to the clearing position while the other needles remain in an idle position as indicated by curve Nb.

Figure 3A:
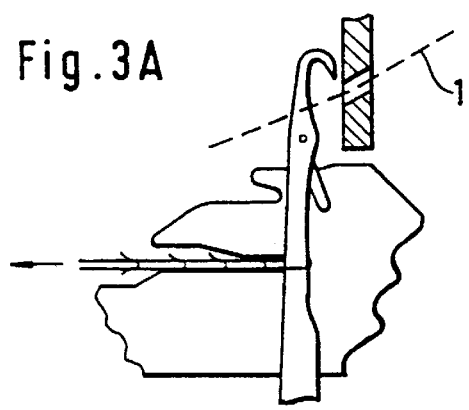
FIG. 3A to 3G is a side view of the stitch forming parts of the needles and sinkers at the positions indicated by A to G in FIG. 3.
Figure 3B:
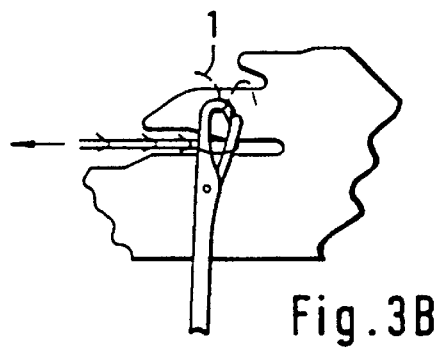
Figure 3C:
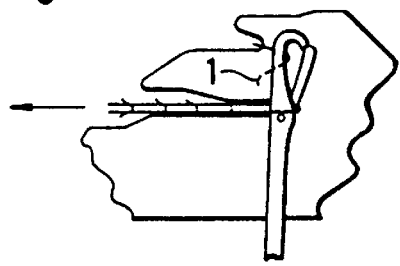
Figure 3H:
FIG. 3H illustrates the arrangement of yarn 1 according to FIG. 3C.

When the selected needles are raised into the clearing position, according position A in FIG. 3, the stitches on these needles will slide onto the needle stems as shown in FIG. 3A. In this position a first yarn 1 is fed to the raised needles. Subsequently, the raised needles are retracted to an intermediate position and the sinkers are moved slightly outwardly as on FIG. 3B so that the first yarn is kinked from the relevant needles into loops over the looping ledge Sb as demonstrated in FIG. 3B. Thereafter, the sinkers are actuated again to move inwardly to control the length of the previous loops, respectively, arranging the floats of the first yarn behind the backs of the needles by their throats Se, according to FIG. 3C at position C in FIG. 3. This is also illustrated in FIG. 3H, seen from the top.

In the succeeding action all of the needles that are supposed to engage the second yarn 2 are raised to the clearing position according to curve Nc at position D in FIG. 3. These are the needles which previously were in an idle position and the needles for knitting both yarns to plated stitches.

According to curve Nc, the stitches of the previous idle needles will slide onto the stems of the needles (as shown before in FIG. 3A) while the remaining needles are controlled corresponding to curve Nd in an idle position, as shown in FIG. 3.

By the described movements of the sinkers, the loops and floats from yarn 1 are engaged by the sinker throat Se which prevents their movement together with the needles. Thereby, the closed needle hooks of those needles which have previously looped yarn 1 are opened, as shown in FIG. 3D.

Figure 3D:
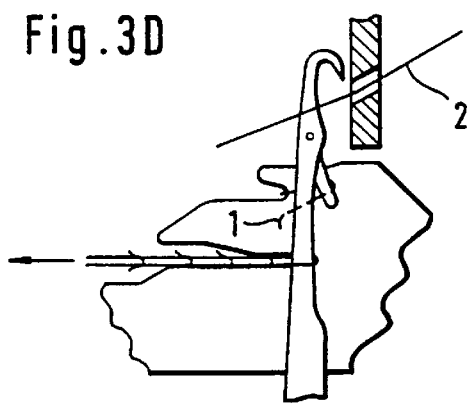

According to in position D in FIG. 3, the yarn 2 is fed to the raised needles as shown in FIG. 3D. Thereafter, corresponding to curve Nc, the raised needles are retracted to an intermediate position to kink loops from yarn 2 corresponding to position E in FIG. 3.

Figure 3E:
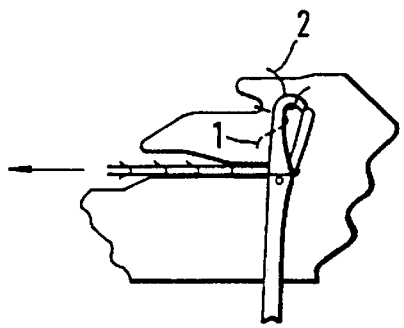

As shown in FIG. 3E the yarn 2 is kinked over the upper looping ledge Sc to form loops or floats (where needles are missing), respectively.

Figure 3F:
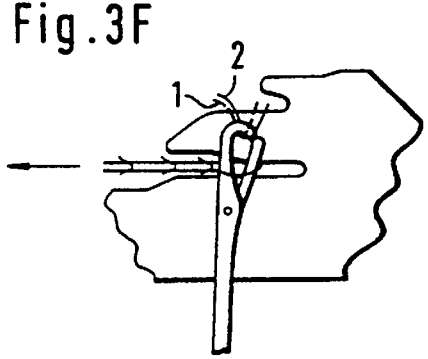

Subsequently in contrast to the prior art the needles are retracted to a lower intermediate position and the sinkers are retracted, so that by their cooperative movement the previous of loops of plating yarn 2 are transferred to the intermediate looping ledge Sb under correct control of their structure, as illustrated in FIG. 3F, which shows position F in FIG. 3.

Figure 3G:
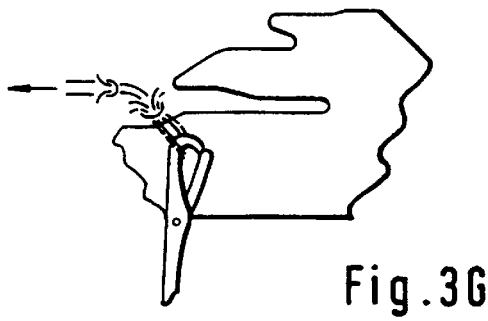

The knitting of a course is performed by a further retraction of the sinkers outwardly and retraction of the needles to the stitch forming action on the knitting ledge Sa of the sinkers S at position G in FIG. 3 and is shown in more detail in FIG. 3G, and by an adjusted control of the sinker and needle movement the previous looped yarn structures are controlled close to the stitch forming.

The described process can be simplified among other things by the retraction of the needles raised to engage the second yarn 2 immediately after to the stitch forming action. The outward movement of the sinkers must be controlled thereby in a way in which a looping of yarn 2, prior to the stitch forming action, is avoided.

Another modification of the described process is performed by kinking the first yarn 1 over the upper looping ledges Sc of the sinkers. These loops must be transferred by an adequate needle and sinker movement to the looping ledge Sb analogous to the actions performed thereafter with yarn 2 referred in the above description according to FIG. 3E and 3F.

One of the essential differences of the described process in respect to the invention as illustrated in FIG. 3, 3A to 3G in contrast to the referred modification of the three thread fleece process (U.S. Pat No. 3,406,538) is based in raising a part of needles in the second as well as in the first looping action and kinking the yarns on different ledges of the sinkers, so that a third raising action of all needles for engaging a special ground yarn is not necessary.

The described process requires a correct adjustment of the loop lengths of both yarns to one another and, therefore, an exact adjustment of the knitting machine for controlling each of the looped yarns.

Figure 4:
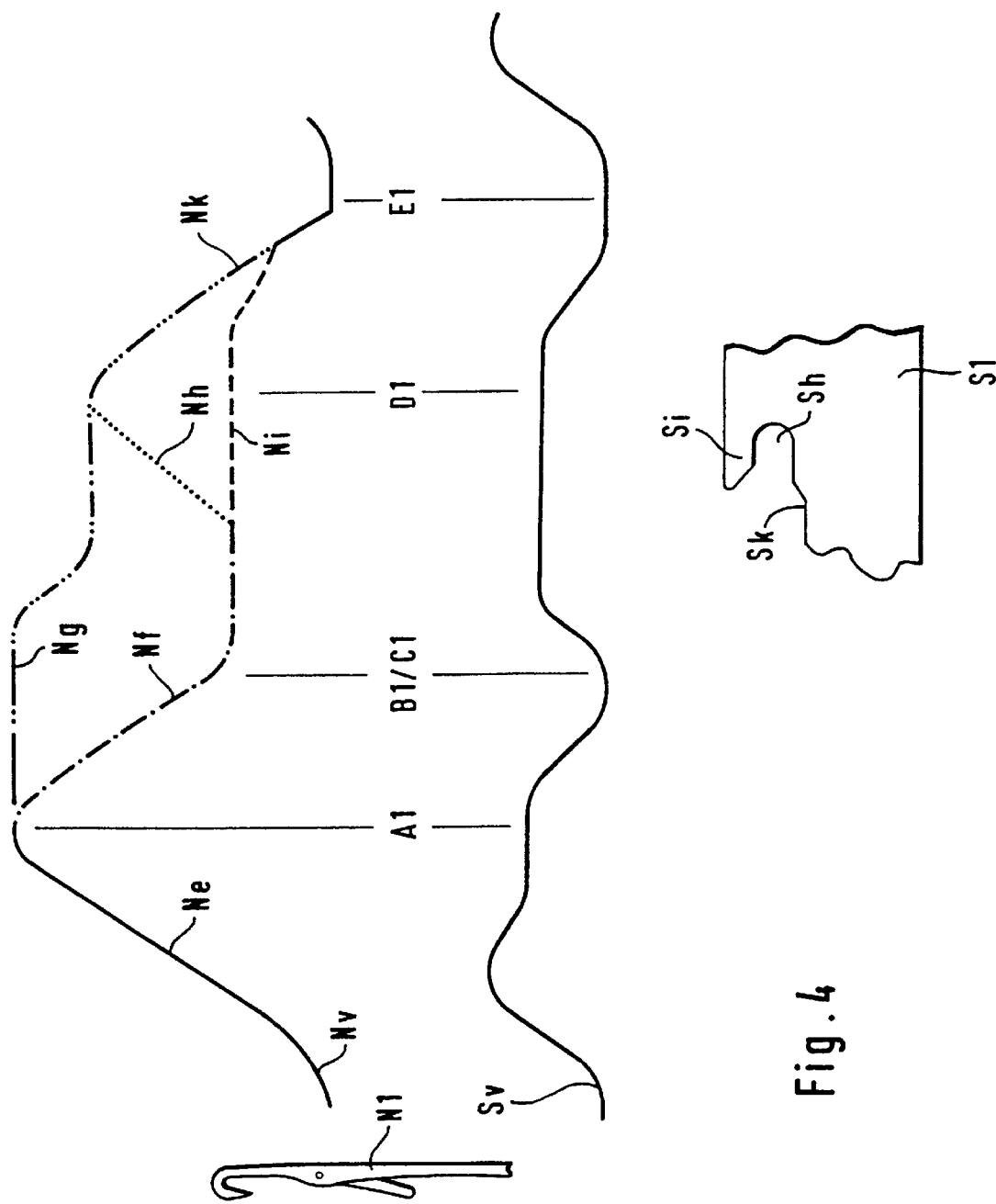
FIG. 4 is a diagram showing the tracks of needles and sinkers alternatively to FIG. 3 for knitting a float plated fabric from two yarns per course.
Figure 4A:
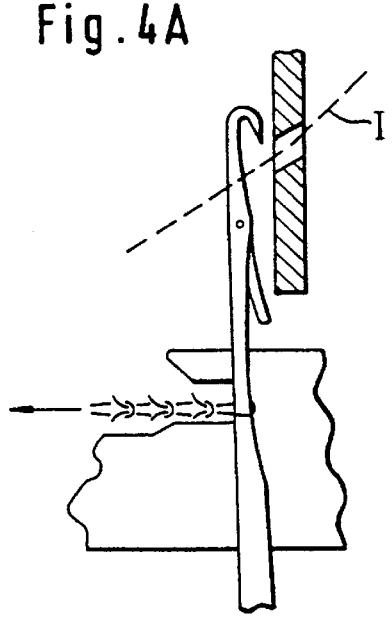
FIG. 4A to 4E is a side view to the stitch forming parts of the needles and sinkers according to the positions indicated by A1 to E1.

To avoid the exact adjustment for controlling the both looped yarns previous to the knitting action, float plated fabrics composed of two yarns per course can also be manufactured according to the knitting diagram in FIG. 4 with details of this process being illustrated in FIG. 4A to 4D corresponding to positions A1 to D1 in FIG. 4.

Referring to FIG. 4 all needles N1 are controlled corresponding to the curve Nv and its subdivisions Ne and Nk, respectively. The required selection mechanism to raise and retract predetermined needles are well known and details thereof are not required for a full understanding of this invention.

The sinkers S1 are provided with an enlarged sinker throat Sh, a sinker neb Si and a knitting ledge Sk.

The knitting process will start with raising all needles according curve Ne into a clearing position at position A1. Corresponding to FIG. 4A the sinkers have engaged and positioned the fabric on the needle stems. In this position a first yarn I is fed to all the raised needles.

Figure 4B:
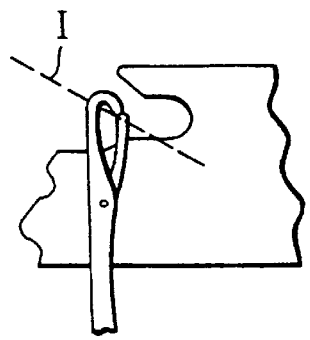
Figure 4C:
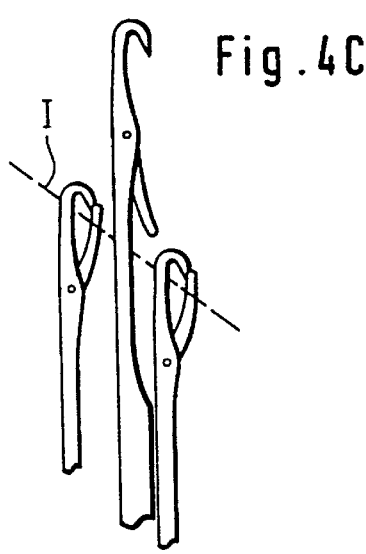
Figure 4D:
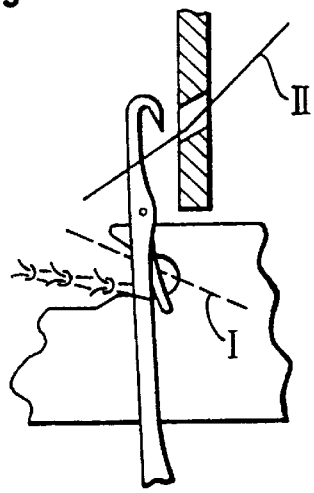

Subsequent to the feeding of yarn I, predetermined needles are retracted, corresponding to curve Nf, to an intermediate position which is realized at position B1/C1 of FIG. 4 for subsequent knitting stitches from this yarn I. Simultaneously with the needle retraction the sinkers are actuated and moved outwardly from their previous inward position shown in FIG. 4A, so that the retracted needles and the sinkers are arranged relative to another as shown in FIG. 4B. The retracted needles thereby will arrange the yarn I on the needle stems of the needles which remain in the clearing position corresponding to curve Ng in FIG. 4, as shown schematically in FIG. 4C.

Thereafter, the needles that had previously remained in a clearing position are retracted to a feeding position so that the latches of these needles will cover the yarn I and the hooks will to close without a yarn. Simultaneously to this needle movement, the sinkers are actuated with their nebs between the needles.

In the subsequent action, predetermined needles, which additionally to yarn I will also engage yarn II, are raised corresponding to curve Nh from an intermediate position to the feeding position whereby their latches will open the needle hooks without problems by yarn I in the enlarged sinker throats. According to position D in FIG. 4, yarn II is then fed to the needles in a feeding position. In contrast to the illustration of FIG. 4D, in which both yarns I and II are engaged by the needle with yarn I being positioned on the latch, yarn I is positioned on needles actuated corresponding to curve Ng behind the latch, so that this yarn portion becomes a float after the stitch forming action.

Figure 4E:
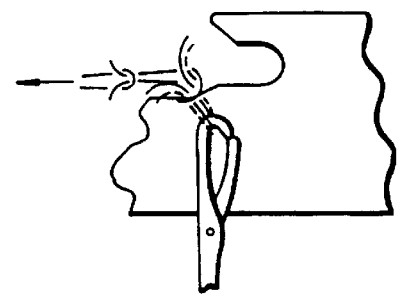

Subsequent to the feeding of yarn II, the sinkers are actuated outwardly and the needles are actuated to the knock over position corresponding to position E1 in FIG. 4 and as illustrated FIG. 4E. Needles actuated corresponding to curves Nf, Nh and Nk will knit stitches from both yarns, needles actuated in the process according to the curves Nf and Ni will knit stitches from yarn I and will miss yarn II, while stitches from yarn II and floats from yarn I are knitted from needles which are controlled corresponding the curves Ng and Nk.

The last referred to process for manufacturing patterned float plated fabrics from two yarns per course do not require additional adjustments of the sinkers as necessary in the process before. Certainly it is not possible with this process to manufacture patterned float plated fabrics composed from three yarns per course.

Figure 5:
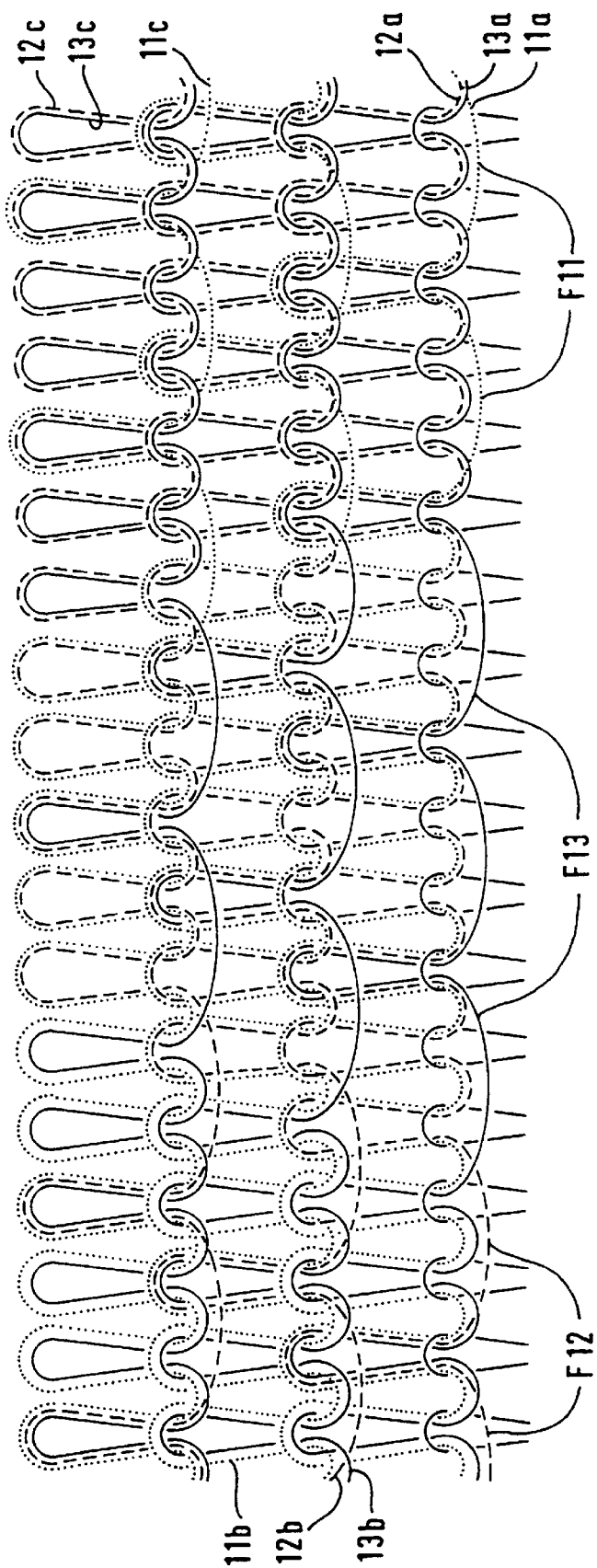
FIG. 5.
Figure 6:
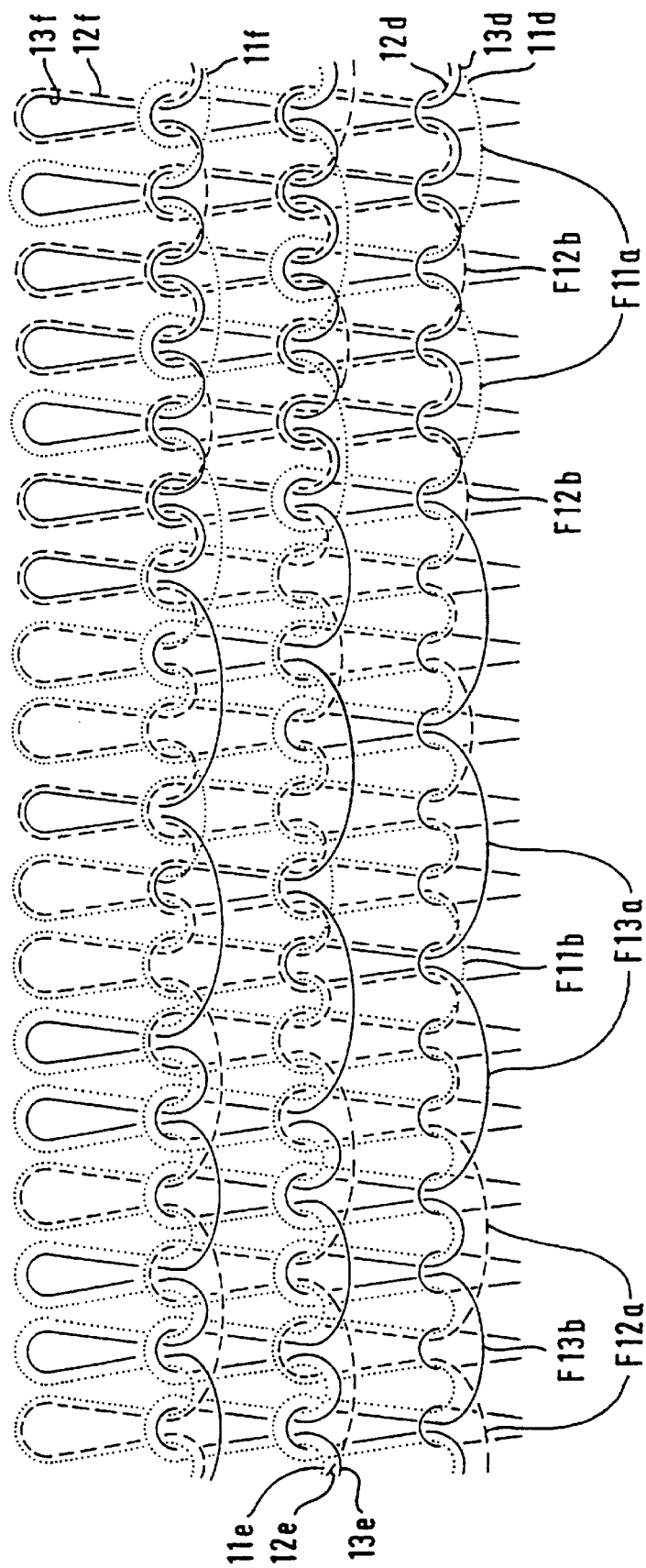
FIG. 6 are different excerpts of fabric constructions in which float plating yarns are incorporated in each course.

Sections of fabric constructions in which three yarns per course are controlled for float plating according to a pattern are illustrated in FIG. 5 and FIG. 6.

Referring to FIG. 5 in each course a first group of yarns (11a, 11b and 11c) is meshed together with a second group of yarns (12a, 12b and 12c) and a third group of yarns (13a, 13b and 13c) in such away that each group of yarns is knit to float plated portions in predetermined sections of the fabric. According to the first knitted course of FIG. 5 comprising yarns 11a, 12a and 13a, in alternative areas floats F11 are formed from the first yarn 11a, the second yarn 12a is knit to floats F12 and the third yarn 13a to floats F13 according to a pattern.

Corresponding to the above description the second course is knit from yarns 11b, 12b and 13b while the third course is prepared from yarns 11c, 12c and 13c. The arrangement of floats from each yarn is formed according to a predetermined pattern.

In contrast to the fabric constructions referred to FIG. 1 and FIG. 2 when alternating between different pattern sections, it is not necessary to knit at least one stitch from all yarns when a course is composed from three yarns, because if two floats will overlap (as illustrated in FIG. 5) the third group of yarns will form the ground fabric portion for the required solidity of the fabric.

Corresponding to the sections of the fabric construction in FIG. 6 therefore, in a pattern area dominated by the floats of one group of yarns, another group of yarn is floating alternatively when the patterning float plating group of yarn is knit to stitches whereby all needles in this section will knit a ground fabric portion from the remaining third group of yarn.

In the first course, which is illustrated in FIG. 6, therefore, between the main floats F11a of a pattern area dominated by yarn lid, floats F12b from yarn 12d are arranged. In an alternative pattern area dominated by floats F12a of yarn 12d, floats F13b from the third yarn 13d are disposed between floats F12a while in other pattern areas dominated by floats F13a, between these floats, floats F11b from the first yarn lid as well as floats F12b from the second yarn 12d are formed.

According to the predetermined pattern the succeeding courses from the yarns 11e, 12e and 13e, respectively, yarns 11f, 12f and 13f are knitted alternatingly forming floats corresponding to the description above.

Therefore, in float plated fabrics formed from three alternatingly plating yarns, innumerable constructions are enabled which are illustrated only basically in the FIG. 5 and FIG. 6 when the yarns are arbitrarily positioned.

Again, it should be noted that the length of the floats is preferably restricted to overlap one, two or three wales and that the creation of pattern areas with floats of different lengths is an additional possibility for pattern development.

Figure 7:
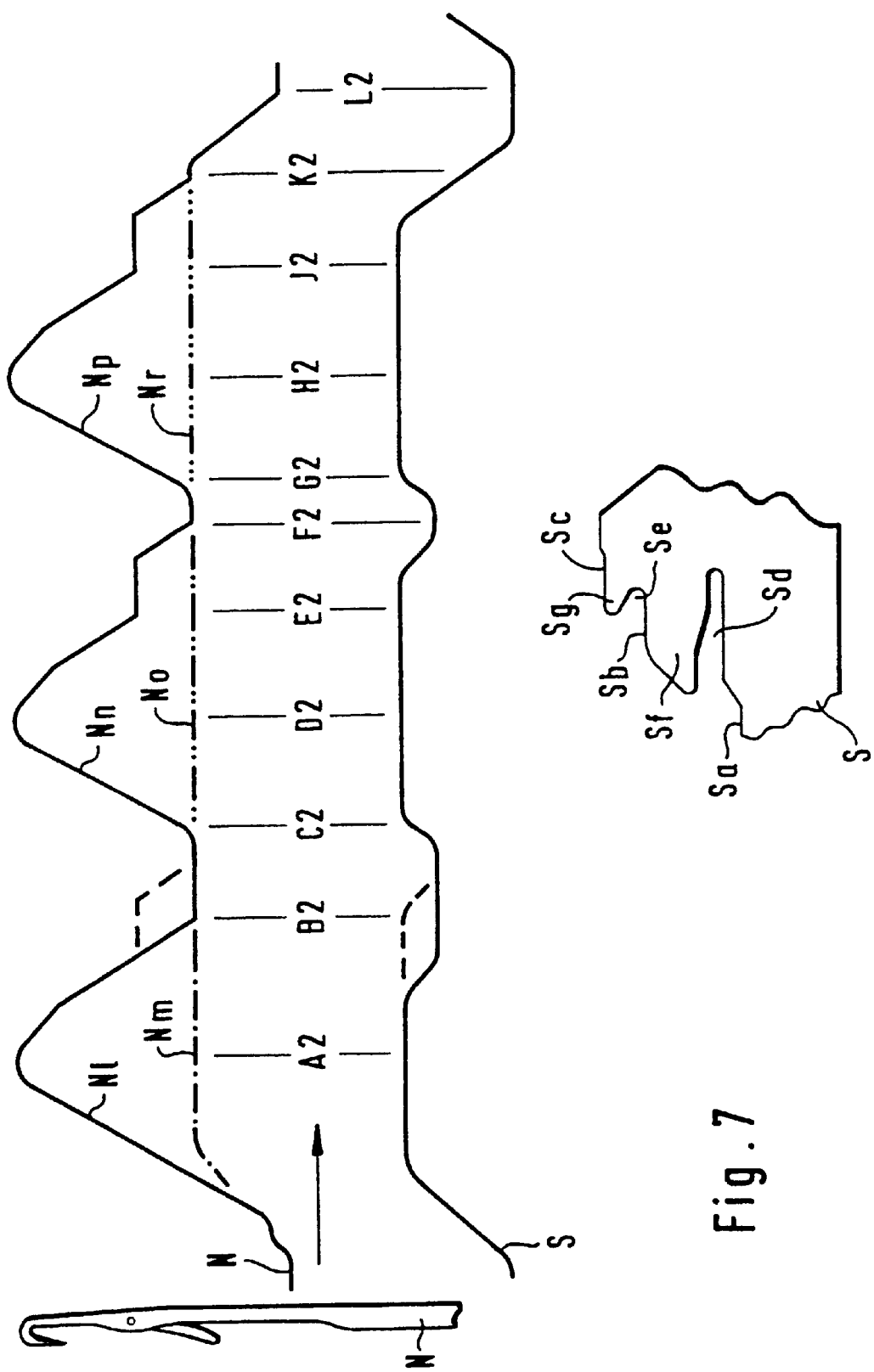
FIG. 7 is a diagram of the needle and sinker track for knitting fabrics according to FIG. 5 and FIG. 6.

The knitting of courses as described corresponding to FIG. 5 and FIG. 6 is realized in the tracks of the needles and sinkers according to FIG. 7, with the relevant arrangement at the positions A2 to L2 being illustrated in FIG. 7A to 7L. In this mode of proceeding sinkers are used which are described and illustrated as referred previously in FIG. 3 and FIGS. 3A to 3G. Therefore, this process is performed hitherto the second yarn is looped in a manner analogous to that previously described.

Subsequent to the knitting of a course, therefore, the stitches of the last course are engaged on the lower sinker throat. By actuating the sinkers and causing them to move inwardly, so that the loops on such needles N, selected to raise into the clearing position corresponding to curve Ne, are prevented from moving with the needles non-selected needles are slightly raised and remain in an idle position as controlled by curve Nm.

Figure 7A:
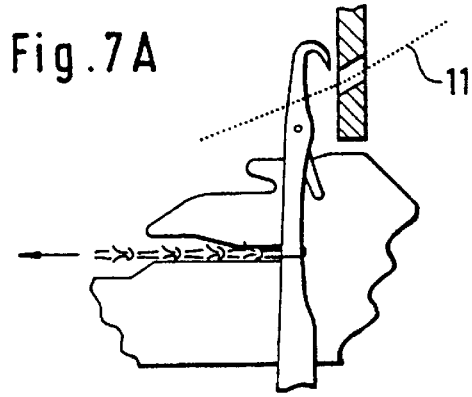

At position A2 selected needles are raised to the clearing position, pursuant to curve N1, so that, as shown in FIG. 7A, the previously knitted stitches are arranged on the needle stems and a first yarn 11 can be fed to these needles.

Figure 7B:
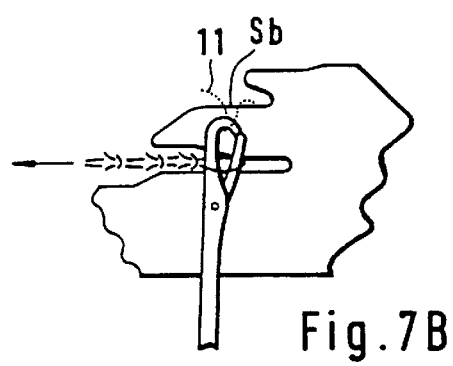

Simultaneously to the retraction of the selected needles to an intermediate position the sinkers are also moved outwardly, so that the previously fed first yarn 11 can be kinked over the intermediate looping ledge Sb of the sinkers S executed in position B2 of FIG. 7 and FIG. 7B, respectively.

Figure 7C:
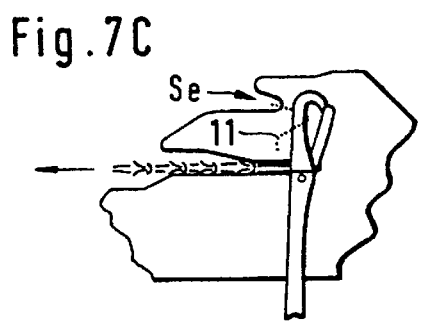
Figure 7M:
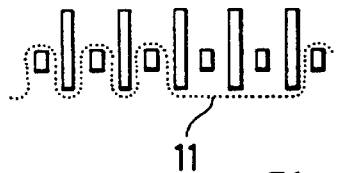

Prior to the raising of selected needles for the engagement of a second yarn the sinkers are again moved inwardly at position C2 in FIG. 7. As illustrated in FIG. 7C, the upper sinker throats Se will control the previous loops from the first yarn 11 and arrange floats of the first yarn 11 behind the needle stems. This is also illustrated in FIG. 7M.

Thereafter, selected needles designated to engage the second yarn 12 are raised in accordance with curve Nn into the clearing position. This raising movement includes all needles previously missed, so that the previous knit stitches will slide onto the needle stems in this action. The latches of such needles, which have engaged the first yarn 11 and will now also engage the second yarn, will open the needle hook by the loops of the first yarn 11, which are controlled in the upper sinker throats Se. Thereby the loops of the first yarn 11 are disposed on the latches of the relevant raised needles or remain in the needle hooks when such needles remain in the idle position corresponding to curve No in FIG. 7.

Figure 7D:
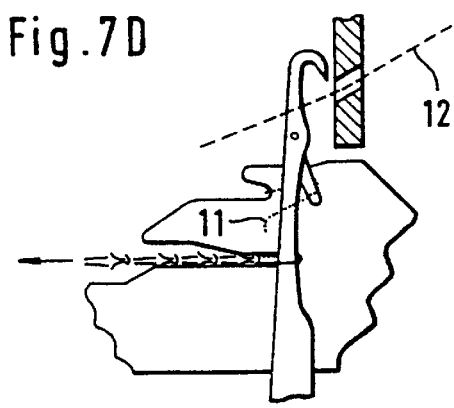

In the position indicated in FIG. 7 at D2, corresponding to the illustrated needle and sinker relationship shown in FIG. 7D, the second yarn 12 is fed to the raised needles which are retracted thereafter into an intermediate position.

Figure 7E:
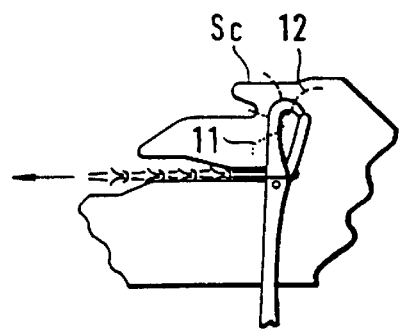

While the sinkers S remain in their inward position the loops of the second yarn 12 are kinked over the upper looping ledge Sc when the selected needles are retracted to their intermediate position corresponding to position E2 in FIG. 7 and FIG. 7E, respectively.

Subsequent to the kinking of the second yarn 12 the sinkers S are moved slightly outwardly and the needles with the loops from the second yarn 12 are retracted to a lower intermediate position, according to position F2 in FIG. 7. By this most important step of the operation, the loops and floats of yarn 12 are transferred from the upper sinker ledge Sc to the intermediate ledge Sb under continuance of the previous calibrated loop structures of yarns 11 and 12, as illustrated in FIG. 7. With this action, it is assured that all loops are controlled furtheron by the subsequent inward movement of the sinkers S by the upper sinker throat Se, and the floats of both yarns are arranged behind the needle stems as shown in FIG. 7G. This relationship of yarns, needles and sinkers is shown in a top plan view in FIG. 7N.

When the previous kinked yarns and floats are again controlled subsequent to the position G2, those needles designated to engage a third yarn are raised corresponding to curve Np. Since each of the raised needles have previously kinked loops from at least one of the yarns 11 and 12, these loops will open the needle hooks by sliding onto the latches on which they will rest. The loops on needles remaining in an idle position corresponding to curve Nr are controlled in their length between the needle hooks and the sinker throats Se. According to position H2 in FIG. 7 a third yarn 13 is fed to the selected raised needles as shown in FIG. 7H.

Thereafter the selected and raised needles are retracted to an intermediate position so that they will kink the fed yarn 13 over the upper looping ledge Sc according position J2 in FIG. 7, as is respectively illustrated in FIG. 7J.

The subsequent retraction of the needles and sinkers must be realized in a way, in which the shape of the yarn loops is also controlled when resting on the intermediate looping ledge Sb (FIG. 7K) directly in front of the stitch forming action (FIG. 7L). When the stitch forming action is terminated the process for knitting the next course is initiated and repeated as described before.

Figure 7F:
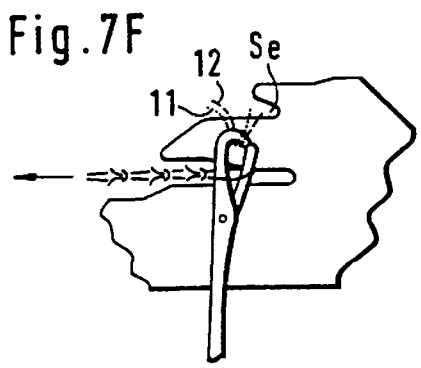

As the foregoing description makes clear, the essential characteristic of the process according to the present invention is that the looping of the second and succeeding yarns is performed over the upper looping ledge Sc. Thereafter, by an adequate movement of the needles and the sinkers, the loops from the ledge Sc are transferred to ledge Sb and to the throats Se, and selected needles are raised for the next yarn engagement. (FIG. 7E, 7F, 7G). This enables exact control of the yarn loops during the complete process and avoids uncontrolled deformations of the previously kinked yarns.

Alternatively to the described embodiments according to FIG. 3 and 7, the first fed yarn can also be formed into loops over the upper looping ledge Sc which are subsequently transferred to the intermediate looping ledge Sb to be controlled in the succeeding part of the process.

To perform this modification the needle and sinker track of FIG. 7 must be adapted according to the dash lines so that between the position B2 and C2 the needles and sinkers are actuated analogous to FIGS. 7E, 7F and 7G for forming loops from the first yarn.

In addition to the described patterned float plated fabrics, the described methods according to FIG. 5 and 7 enable the manufacturing of "false intarsia" fabrics. Each yarn is kinked from predetermined needles for separated pattern sections one to the other which are connected by at least one stitch knitted (in between) from the yarns of the adjoining pattern sections which will interlock these sections, each being formed from single yarn stitches into a solid fabric. If more than three yarns are provided to be knitted per course in the process of FIG. 7 the action for feeding and kinking the second yarn (positions C2 to F2) must be repeated analogous to the number of additional yarns. The length of the floats performed in this action are disposable and will be cut off and removed by well known devices in the knitting machine or in a subsequent shearing process.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A patterned float plated fabric composed of courses, comprising:
   at least two plating yarns in each course arranged such that adjacent pattern sections of the patterned float plated fabric are dominated alternatingly by float plated sections of one of the at least two plating yarns, and such that at least one of the at least two plating yarns is incorporated into stitches of a pattern section, while the other one of the at least two plating yarns is meshed with said first plating yarn by float plating to form stitches and floats;
   wherein a ground fabric is composed of sections of plain courses formed from one of the at least two plating yarns; and
   wherein the sections of plain courses are connected together by at least one stitch formed from the yarns forming the ground fabric of adjacent pattern sections.

2. A process for manufacturing a patterned float plated fabric on a circular knitting machine having latch needles in a cylinder and sinkers in a sinker ring, said sinkers having an upper looping ledge on an upper sinker neb, a lower looping ledge on a lower sinker neb which are spaced from one another by an upper sinker throat while said lower sinker neb is spaced from a knitting ledge by a lower sinker throat, said process comprising:
   a) holding down the fabric by the lower throat of the sinkers positioned at an inward position and raising portions of adjacent needles for knitting portions of a ground fabric and raising predetermined needles located therebetween to a clearing position;
   b) feeding a first plating yarn into the raised needles in step a)
   c) arranging the sinkers such that their lower looping ledges are located between the raised needles;
   d) retracting the raised needles from the clearing position to a lower intermediate position thereby forming loops and floats from said first plating yarn over the lower looping ledges of the sinkers; and thereafter performing at least once the following succession of steps:
   e) actuating the sinkers inwardly to employ the upper sinker throats to control the loops and floats from previous looped yarns;
   f) raising portions of other adjacent needles, for knitting complimentary ground fabric portions, and other predetermined needles located therebetween to a clearing position;
   g) feeding an additional plating yarn into the needles raised in step f)
   h) retracting the raised needles from step f) to an upper intermediate position thereby forming loops and floats from the additional plating yarn over the upper loop forming ledges of the sinkers and controlling all loops and floats formed from previous plating yarns in the upper throat of the sinkers;
   i) retracting the sinkers to arrange the lower loop forming ledges between needles and cooperatively retracting the needles to a lower intermediate position for controlling all loops formed from previous yarns on the lower looping ledge; and
   j) retracting all needles from a lower intermediate position in step i) to a cast-off position in cooperation with an outward movement of the sinkers to knit a new float plated course over the knitting ledge of the sinkers.

3. A patterned float plated fabric according to claim 1, wherein floats of the at least two plating yarns which create the patterned effect of the adjacent pattern sections are arranged to overlap not more than three wales.

4. A patterned float plated fabric according to claim 1 or 3, wherein each yarn knitted to the float plated sections is formed into floats of different lengths in predetermined pattern areas.

5. A process according to claim 2, wherein steps e) through i) are repeated after step i) and before step j.

6. A process according to claim 2 or 5, further comprising kinking the first fed plating yarn after feeding to form loops over an intermediate looping ledge of the sinkers, and kinking succeeding yarns on the upper loop forming ledge of said sinkers and thereafter by adequately moving the needles and sinkers the succeeding yarns are transferred to said intermediate looping ledge to be subsequently engaged by the upper throat of the sinkers prior to the feeding of another yarn for the same course.

7. A process according to claim 2 or 5, further comprising kinking all yarns from which a course is comprised to loops over the upper looping ledge of the sinkers and subsequently transferring such loops to intermediate looping ledges of the sinkers by adequately moving the needles and sinkers to engage and control the loops of the kinked yarns in the upper throat of the sinkers until a stitch forming action is initiated.

8. A process for manufacturing patterned float plated fabrics according to claim 1, on a circular knitting machine comprising latch needles in a cylinder and sinkers in a sinker ring, said sinkers each comprising a neb and a throat, comprising:

a) raising all needles to a clearing position and holding down the fabric in the throat of the sinkers;

b) feeding a first plating yarn to all needles;

c) thereafter retracting the sinkers such that the nebs are positioned outside of the needles;

d) retracting predetermined needles to an intermediate position, and holding the first plating yarn on the stems of such needles which remain in the clearing position;

e) actuating the sinkers to position their nebs between the needles;

f) retracting all needles which remain in the clearing position to a feeding position;

g) raising predetermined other needles from the intermediate position to a feeding position;

h) feeding a second plating yarn to the needles in the feeding position;

i) retracting the sinkers to position their nebs outside of the needles; and j) retracting all needles to a cast-off position for knitting a new float plated course.

9. A patterned float plated fabric according to claim 1, wherein floats which create the patterned effect are arranged to overlap at least two wales.

10. A patterned float plated fabric according to claim 1, wherein floats which create the patterned effect are arranged to overlap at least three wales.

* * * * *